(12) United States Patent  (10) Patent No.: US 8,025,433 B2
Comrada  (45) Date of Patent: Sep. 27, 2011

(54) STROLLER LIGHT

(76) Inventor: Catherine Comrada, Menlo Park, CA (US)

( * ) Notice: Subject to any disclaimer, the term of this patent is extended or adjusted under 35 U.S.C. 154(b) by 281 days.

(21) Appl. No.: 12/221,431

(22) Filed: Aug. 4, 2008

(65) Prior Publication Data

US 2010/0027285 A1  Feb. 4, 2010

(51) Int. Cl.
*F21V 9/00* (2006.01)
(52) U.S. Cl. ............................ 362/543; 362/183; 362/84
(58) Field of Classification Search .................. 362/543, 362/84, 138, 183, 549, 544, 191, 249.02, 362/396, 234; 280/47.38, 47.39, 47.4, 47.41
See application file for complete search history.

(56) References Cited

U.S. PATENT DOCUMENTS

| 1,381,313 | A  | * | 6/1921 | Kaufmann | 362/476 |
| 7,055,978 | B2 | * | 6/2006 | Worthington | 362/103 |
| 2003/0185018 | A1 | * | 10/2003 | Comrada | 362/544 |
| 2007/0035956 | A1 | * | 2/2007 | Topps | 362/473 |

\* cited by examiner

*Primary Examiner* — Sharon E Payne

(57) ABSTRACT

A stroller light that can be easily attached to any standard baby stroller. The stroller light is comprised of a hollow housing that holds a battery pack, electric circuit, and on-off switch. A plurality of LEDs are mounted through apertures on the front and sides of the housing and can sequentially turn on and off. A hollow flag pole can be attached to the housing and wires run from the housing, through the flag pole interior to an electroluminescent wire that is sewn onto the perimeter of the flag and to an amiable light that can be used to help navigate during the evening hours. A photovoltaic solar cell is attached to the outside of the housing and can charge the battery pack during daylight hours.

1 Claim, 6 Drawing Sheets

STROLLER LIGHT

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of portable lighting devices and more specifically to a stroller light.

Various types of safety lights that can be attached to a person's clothes or bicycle or the like are known and are available in the marketplace. Recently the use of LED type flashing lights has become popular and have been designed to attach to a person's clothing or body part, or attached to a bicycle.

However, none of the present designs effectively addresses the application of a safety light that can easily attach to the frame of a baby stroller. Additionally, the existing designs do not allow for the safety light to be able to be attached and also easily removed. Additionally, the current designs do not have the provision to attach a flag pole and flag assembly. Finally, the existing designs to not have the provision for the flag perimeter to be lit by an electroluminescent wire and for the flag pole to terminate in an amiable light that can be used to help the user navigate during evening hours.

BRIEF SUMMARY OF THE INVENTION

The primary object of the invention is to provide a light for a baby stroller that it can be seen by drivers of vehicles or bicycles.

Another object of the invention is to provide a light for a baby stroller that can be easily attached to a variety stroller designs.

Another object of the invention is to provide a light for a baby stroller that includes a means to attach an additional flag pole and flag.

A further object of the invention is to provide a light for a baby stroller that includes an amiable light that helps the user see during darkened conditions.

Yet another object of the invention is to provide a light for a baby stroller that can also be clipped onto a person's clothing or wearable strap.

Still yet another object of the invention is to provide a light for a baby stroller that can be powered by a solar cell that is recharged during daylight hours.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed Stroller light comprising: a hollow housing, a male attachment member, a female receptacle for said male attachment member, a stroller attachment assembly, a rotatable flag pole joint, a hollow flag pole, a flag, an amiable portable light and light housing, an on-off switch for said portable light, a photovoltaic solar cell, a rechargeable battery pack, a light controlling and battery charging integrated circuit, an on-off switch, an elecroluminescent wire, a plurality of LEDs, said stroller attachment assembly capable of being fastened onto the frame of a stroller in a standard way, said stroller attachment assembly including said female receptacle with which to releasably attach said male attachment member located on said housing, said battery pack, said integrated circuit and said on-off switch mounted within said hollow housing, said housing having said male retaining member fixedly attached to the outside rear surface, said housing having said solar cell fixedly mounted to the front outer surface of said housing, said flag pole terminating at one end in said flag and said amiable portable light, said portable light having said on-off switch mounted on said light housing, said flag pole terminating at the opposite end in a tip capable of releasably plugging into said rotatable flag pole joint said flag including a length of elecroluminescent wire sewn to the perimeter edge of said flag, said flag pole including wires that carry current to said amiable light and said electroluminescent wire from said battery pack, said hollow housing including an attachment clip capable of releasably attaching to an article of clothing, said hollow housing including a plurality of apertures that accept a plurality of LEDs mounted radially around the front surface of said housing and mounted radially along the side wall of said housing, and said LED's capable of sequentially turning on and off to warn oncoming drivers and bicycles of said stroller's presence.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
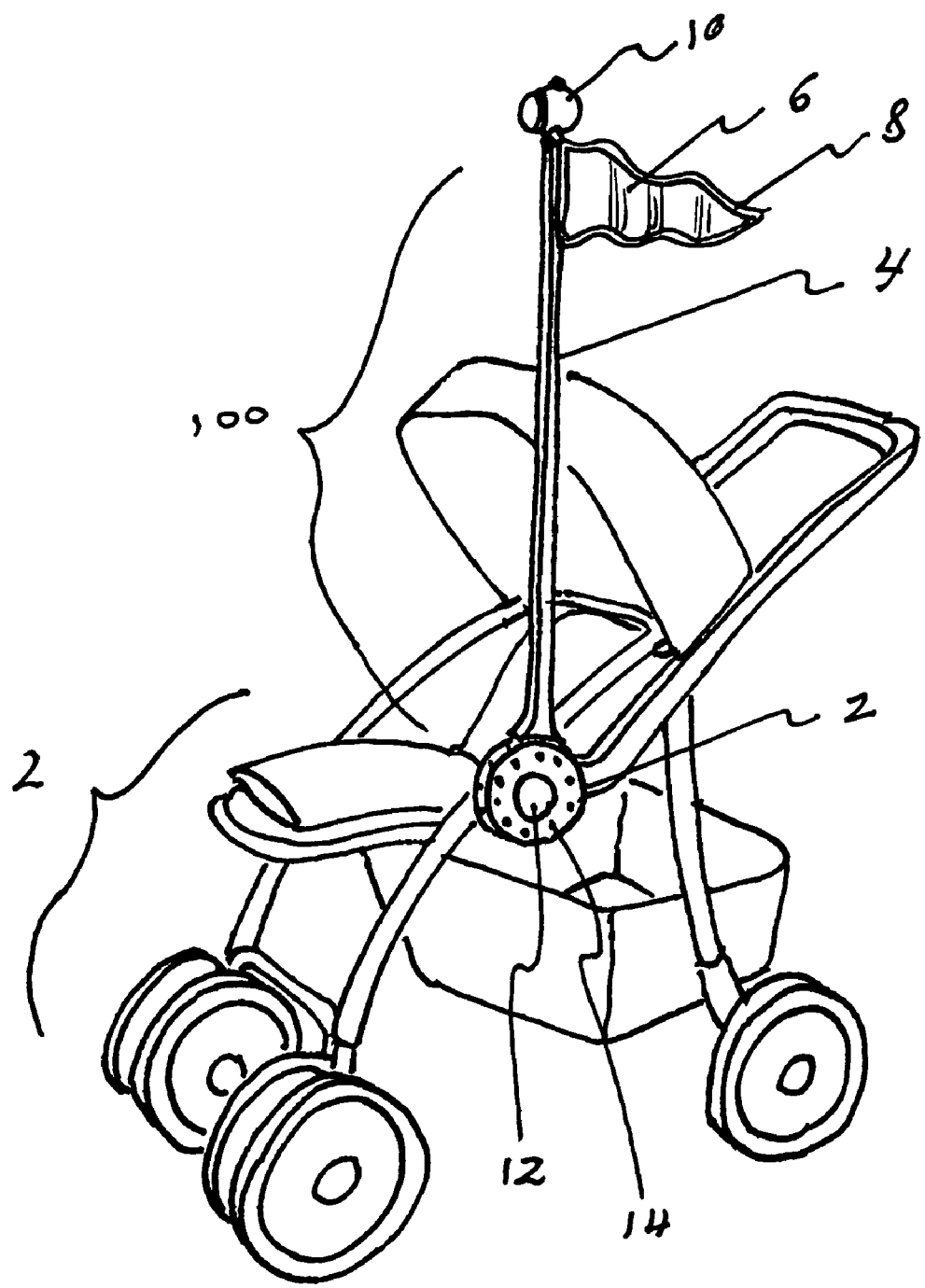
FIG. 1 is a perspective view of the invention attached to a standard baby stroller

Referring now to FIG. 1 we see a perspective view of a baby stroller 2 and the invention 100 attached to the frame of the stroller 2. The hollow housing 2 has a plurality of apertures that allow a plurality of LEDs 14 to protrude. The LEDs are programmed to sequentially turn on and off. A photovoltaic solar cell 12 is mounted to the outside of the housing 2 and can charge the battery pack 22 located inside the housing 2 during daylight hours so that the battery pack 22 will be charged for night time use. The housing 2 can accept a flag pole 4 and flag 6. The flag 6 includes an electroluminescent wire 8 sewn around its perimeter. Additionally, an amiable light 10 is located on top of the flag pole and can be operated at night to help the user navigate during evening hours.

Figure 2:
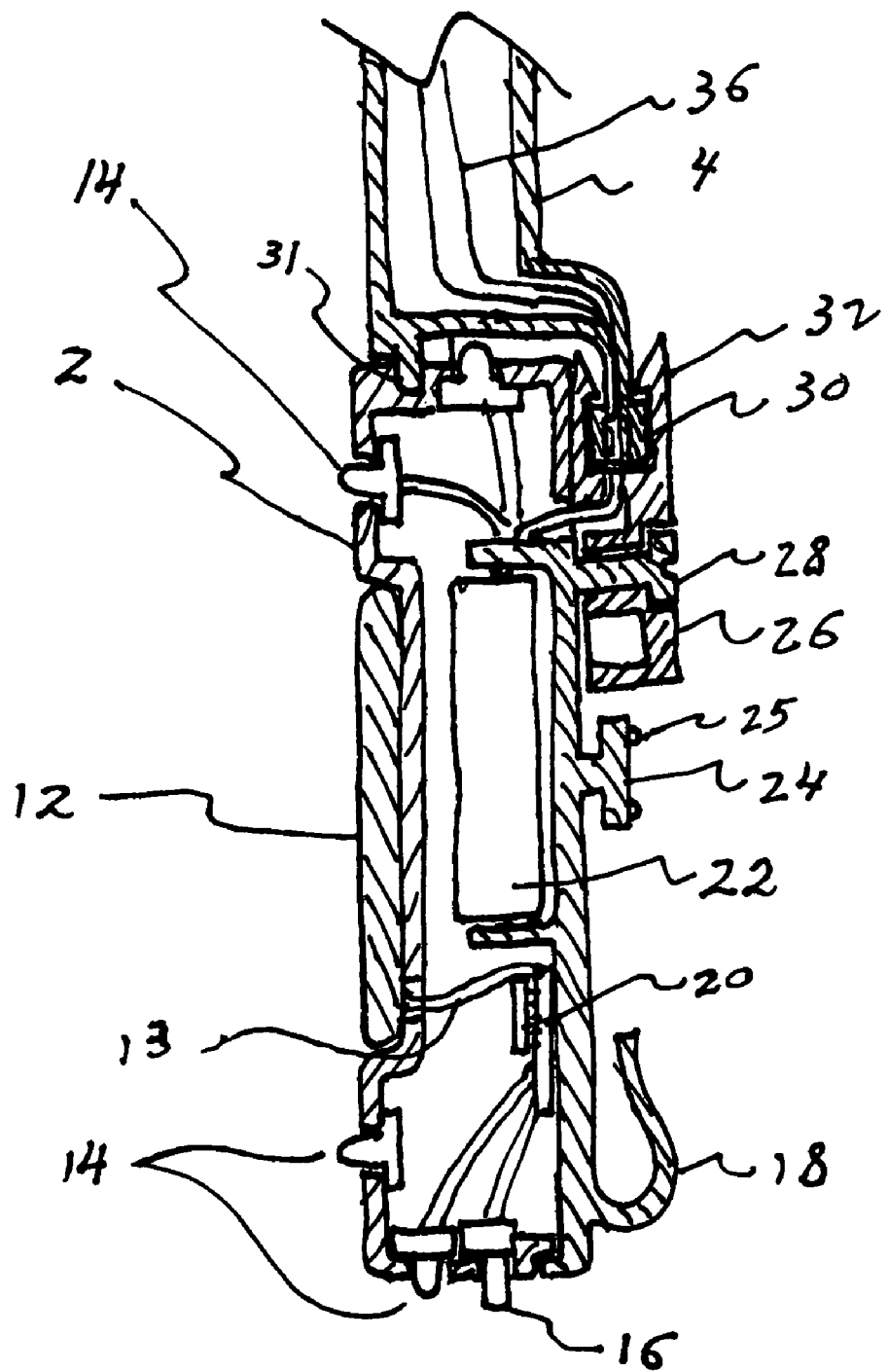
FIG. 2 is a side section view of the hollow housing
Figure 6:
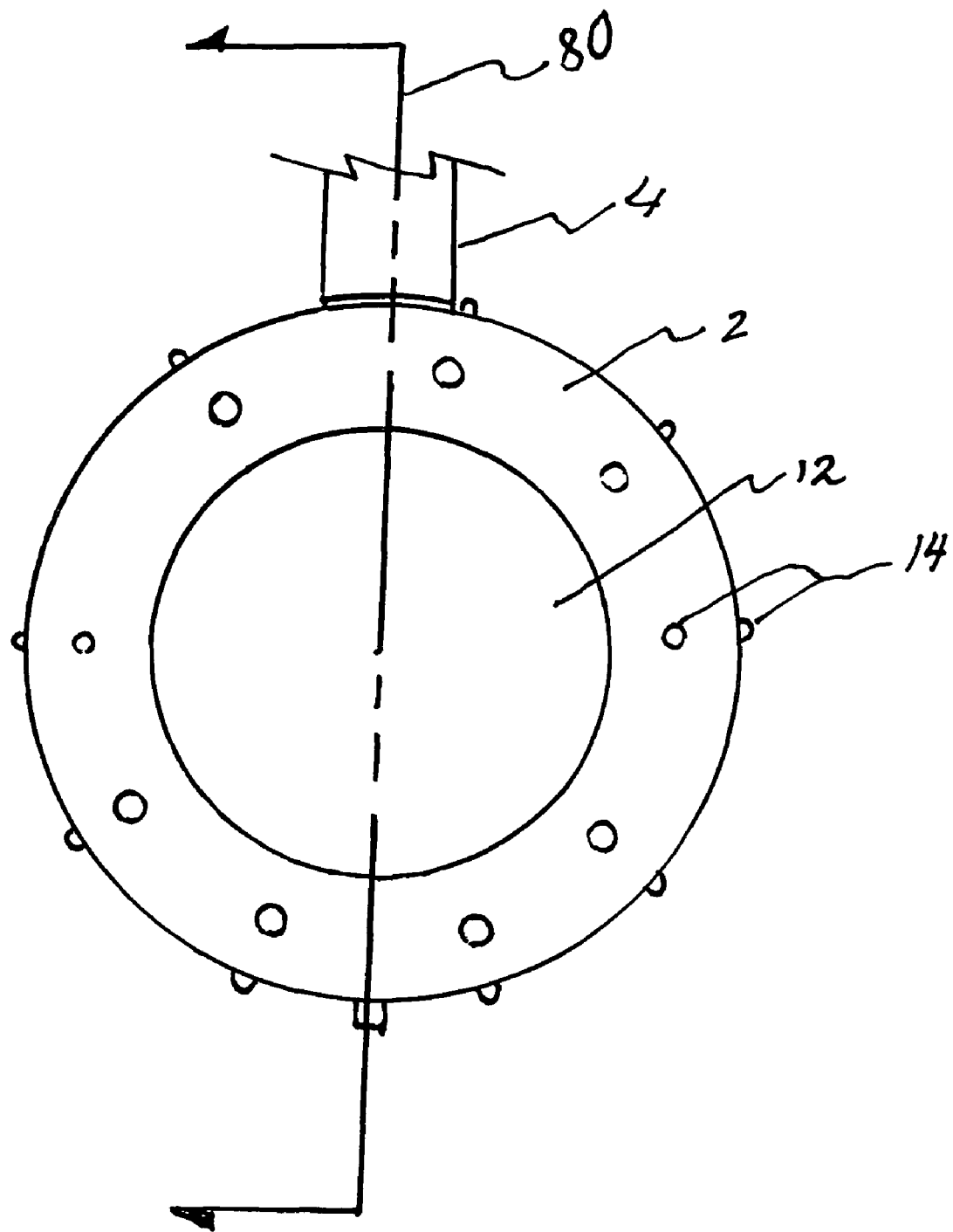
FIG. 6 is a front view of the hollow housing.

FIG. 2 is a section view of housing 2 as defined by section line 80 shown in FIG. 6. Hollow housing 2 holds a rechargeable battery pack 22, a plurality of LEDs 14, an integrated circuit 20 and on-off switch 16 photovoltaic solar cell is mounted in a depression on the front of housing 2, wires 13 attach the solar cell to the charging batteries 22. Flag pole tip 30 can be seen plugged into socket 32 of rotating flag pole retainer member 26. Rotating member rotates about post 28 and allows the user to rotate the housing so that the flag pole can be placed in a vertical position no matter what angle the stroller frame is with respect to the stroller attachment assembly 50 shown in FIG. 4. The flag pole tip 30 also provides electrical connection of the wires 36 located within hollow flag pole 4 and the electrical components found inside housing 2. Tab 31 provides additional support for flag pole 4. LEDs 14 can be clearly seen protruding through apertures in housing 2. Switch 16 can be clearly seen mounted at the bottom of housing 2. Male attachment member 24 can be seen fixedly attached to the back panel of housing 2. Clothing clip 18 can also be seen and is a means to attach the housing 2, without flag pole 4, to a person's clothing if so desired.

Figure 3:
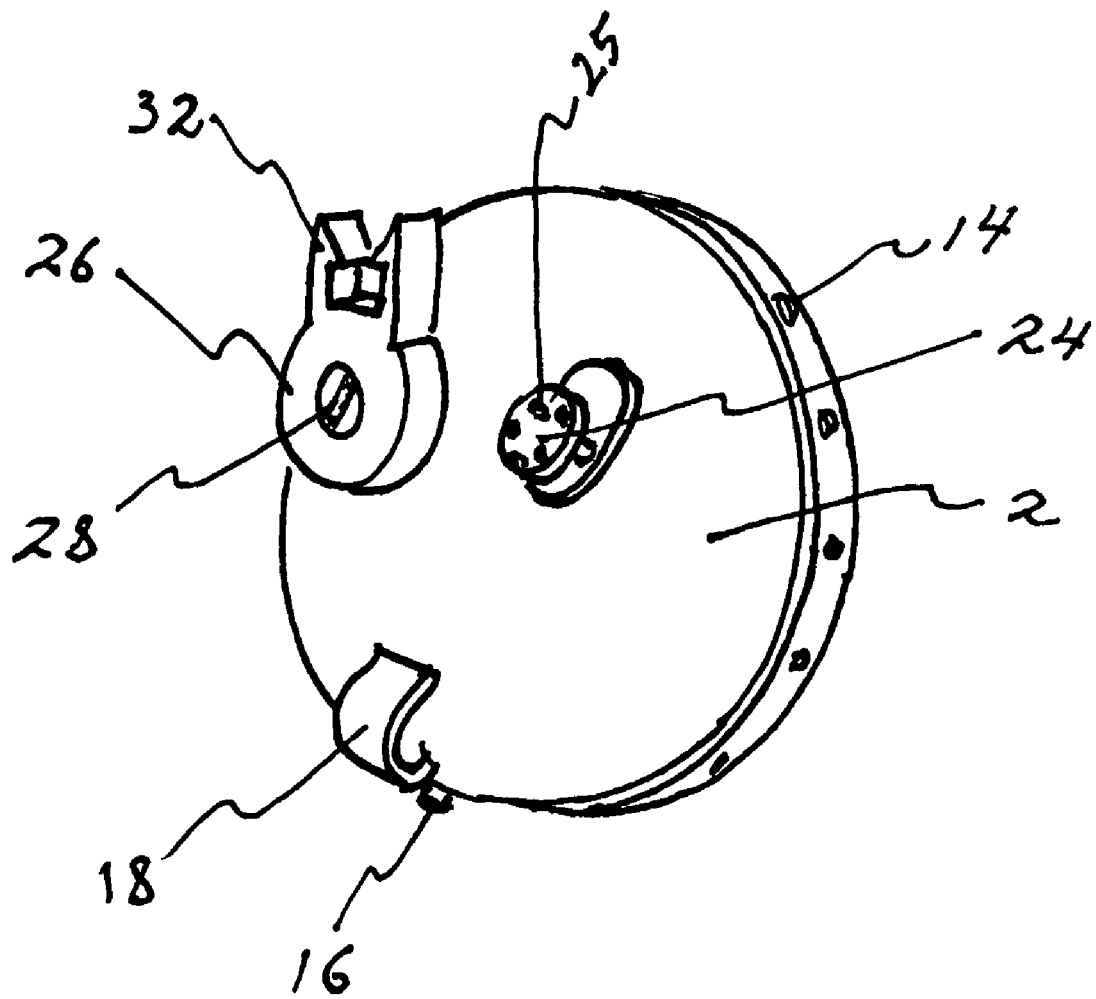
FIG. 3 is a rear perspective view of the hollow housing.

FIG. 3 shows a rear view of housing 2. Rotating flag pole retaining member 26 can be clearly seen. Retaining legs 32 allow the flag pole 4 to be removed and replaced. The flag pole holder 26 can rotate about post 28 as explained above. Clothing clip 18 and male attachment member 24 can be clearly seen.

Figure 4:
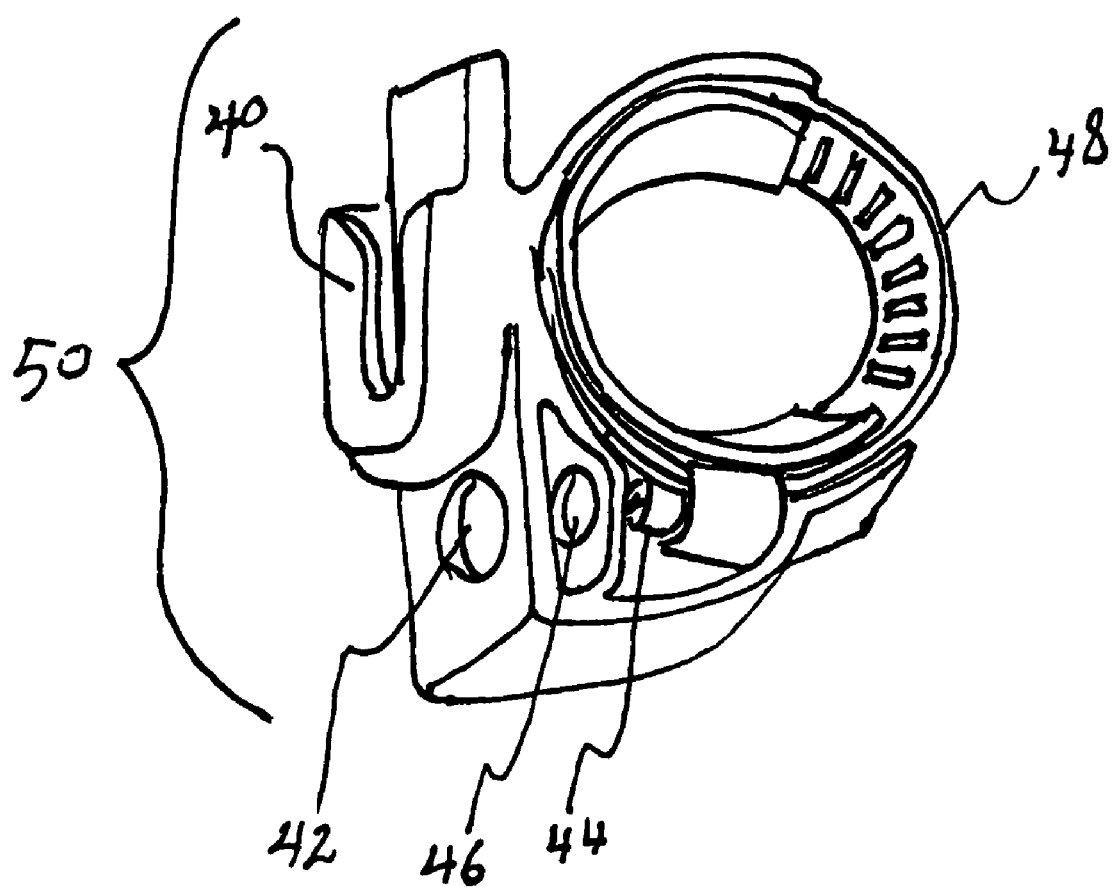
FIG. 4 is a perspective view of the stroller attachment clip assembly.

FIG. 4 shows a perspective view of the stroller attachment assembly 50. The assembly 50 attaches to the frame portion of a stroller via standard pipe clamp 48. The user can tighten the clamp by inserting a screw driver through apertures 42 and 44 and tightening screw 4. Female receptacle 40 can accept male attachment member 24 located on the back of housing 2. The male attachment member can be easily removed and replaced from its female receptacle 40. A plurality of bumps 25 on male member 24 interact with depressions inside female receptacle 40 so that the housing 2 will not rotate once fixed in place on the stroller attachment assembly 50.

Figure 5:
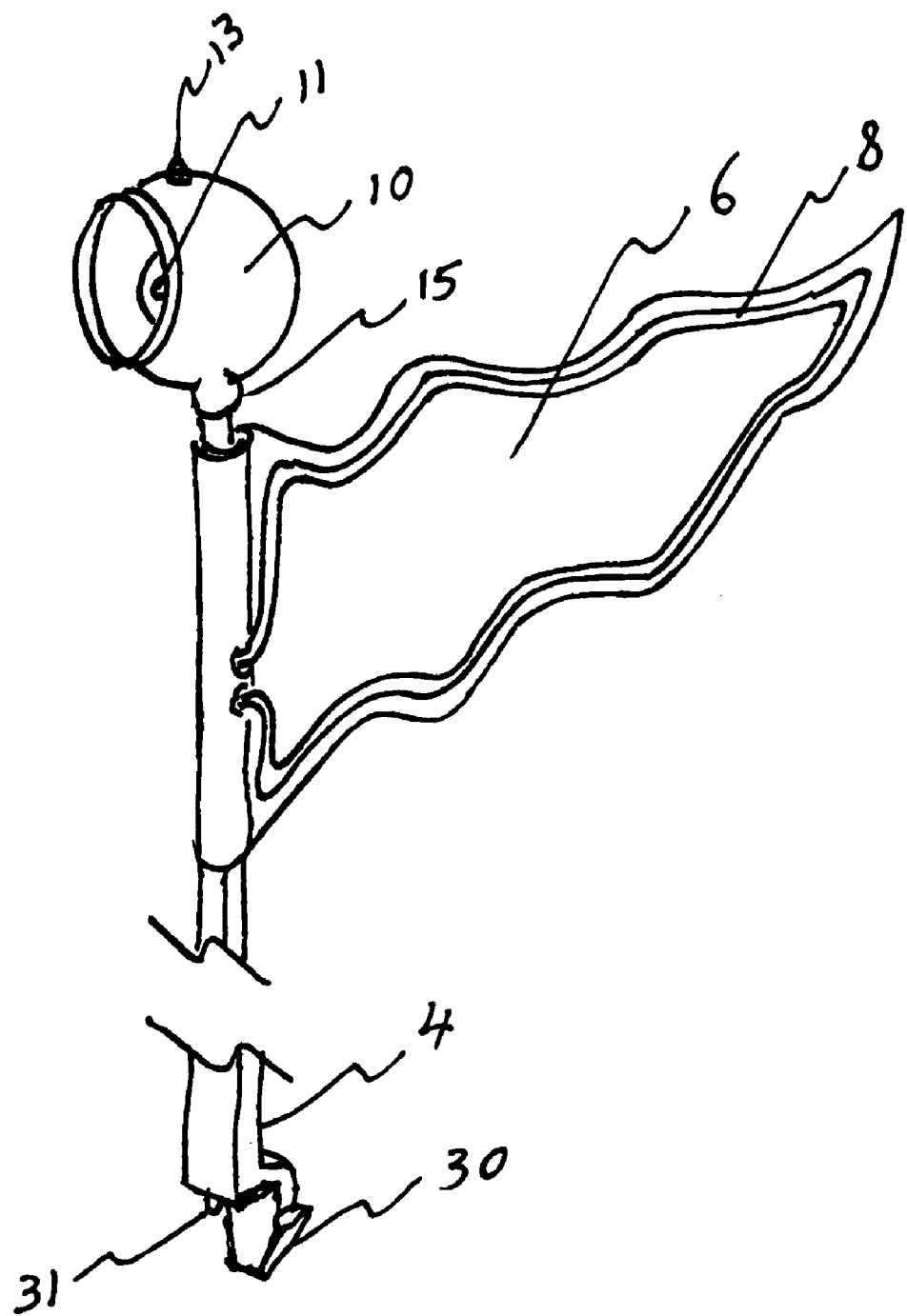
FIG. 5 is a perspective view of the flag, flag pole and amiable light.

FIG. 5 shows a partial perspective view of flag pole 4. Bottom connector tip 30 can be clearly seen. Flag 6 can be seen with electronluminescent wire 8 sewn in place and the wires entering flag pole 4 so that the wire can receive power from the batteries in the housing 2. Amiable light 10 can be positioned via a standard swivel joint 15. High powered white LED 11 can be turned on via on-off switch 13.

FIG. 6 shows a front view of the housing 2 and clearly shows the radially displaced LEDs 14 both on the front of and on the side of housing 2.

The entire invention described and illustrated above shows that the stroller light of the present invention is a novel and superior way for a person to attach a light to a stroller for the purpose of alerting on coming drivers and bicycle riders of the presence of a baby stroller. The amiable light atop the flag pole lets the user navigate more easily during evening hours. The illuminated flag further adds to the visible presence of the stroller. The user need not worry about failing batteries since the photovoltaic solar cell on the front of the housing recharges the batteries during daylight hours.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Stroller light comprising:
   a hollow housing;
   a male attachment member;
   a female receptacle for said male attachment member;
   a stroller attachment assembly;
   a rotatable flag pole joint;
   a hollow flag pole;
   a flag;
   an aimable portable light and light housing;
   a first on-off switch for said portable light;
   a photovoltaic solar cell;
   a rechargeable battery pack;
   a light controlling and battery charging integrated circuit;
   a second on-off switch;
   an electroluminescent wire;
   a plurality of LEDs;
   said stroller attachment assembly capable of being fastened onto the frame of a stroller in a standard way;
   said stroller attachment assembly including said female receptacle with which to releasably attach said male attachment member located on said housing;
   said battery pack, said integrated circuit and said second on-off switch mounted within said hollow housing;
   said housing having said male retaining member fixedly attached to the outside rear surface;
   said housing having said photovoltaic solar cell fixedly mounted to the front outer surface of said housing;
   said flag pole terminating at one end in said flag and said aimable portable light;
   said portable light having said first on-off switch mounted on said light housing;
   said flag pole terminating at the opposite end in a tip capable of releasably plugging into said rotatable flag pole joint;
   said flag including a safety light in the form of a length of electroluminescent wire sewn to the perimeter edge of said flag;
   said flag pole including wires that carry current to said aimable portable light and said electroluminescent wire from said battery pack;
   said hollow housing including an attachment clip capable of releasably attaching to an article of clothing;
   said hollow housing including a plurality of apertures that accept a plurality of LEDs mounted radially around the front surface of said housing and mounted radially along the side wall of said housing;
   said LEDs capable of sequentially turning on and off to warn oncoming drivers and bicycles of said strollers presence; and
   said aimable portable light capable of being aimed down to illuminate a child sitting in said stroller.

* * * * *